United States Patent
Kawakami

(10) Patent No.: US 8,905,096 B2
(45) Date of Patent: *Dec. 9, 2014

(54) PNEUMATIC TIRE WITH TREAD HAVING CAP PORTION, SEGMENTED BASE PORTION AND CONDUCTIVE PORTION

(75) Inventor: Kazuki Kawakami, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 763 days.

This patent is subject to a terminal disclaimer.

(21) Appl. No.: 12/861,078

(22) Filed: Aug. 23, 2010

(65) Prior Publication Data

US 2011/0303332 A1 Dec. 15, 2011

(30) Foreign Application Priority Data

Jun. 9, 2010 (JP) .................................. 2010-132095

(51) Int. Cl.
*B60C 11/00* (2006.01)
*B60C 19/08* (2006.01)

(52) U.S. Cl.
CPC ........... *B60C 11/0075* (2013.01); *B60C 19/082* (2013.01); *B60C 2011/0025* (2013.01); *Y10S 152/02* (2013.01)
USPC .................. 152/152.1; 152/209.5; 152/DIG. 2

(58) Field of Classification Search
CPC ........................... B60C 11/0075; B60C 19/082
USPC .................. 152/152.1, 209.5, 209.18, DIG. 2
See application file for complete search history.

(56) References Cited

U.S. PATENT DOCUMENTS

| | | | | |
|---|---|---|---|---|
| 5,942,069 | A | * | 8/1999 | Gerresheim et al. ........ 152/152.1 |
| 6,247,512 | B1 | * | 6/2001 | Radulescu ................. 152/209.5 |
| 6,415,833 | B1 | | 7/2002 | Komatsu |
| 8,171,966 | B2 | * | 5/2012 | Kawakami ................. 152/152.1 |
| 2002/0185210 | A1 | | 12/2002 | Poulbot |
| 2006/0102264 | A1 | | 5/2006 | Nicolas |
| 2006/0174986 | A1 | * | 8/2006 | Ogawa ........................ 152/152.1 |
| 2006/0180255 | A1 | * | 8/2006 | Marriott et al. ............ 152/152.1 |

(Continued)

FOREIGN PATENT DOCUMENTS

EP 1512554 A1 3/2005
EP 1997653A1 A1 12/2008

(Continued)

OTHER PUBLICATIONS

Machine translation for Japan 2003-127613 (no date).*

(Continued)

*Primary Examiner* — Steven D Maki
(74) *Attorney, Agent, or Firm* — Fish & Richardson P.C.

(57) ABSTRACT

A tread rubber includes a cap portion formed by a nonconductive rubber, a base portion formed by a nonconductive rubber, and a conductive portion formed by a conductive rubber. A rubber hardness of the cap portion is higher than a rubber hardness of the base portion. The base portion is segmented in a tire width direction. A rubber forming the cap portion is filled in a recess at a segmented position. The conductive portion has a first portion which is provided in an outer side of the segmented position and extends to an inner side in the tire diametrical direction from the ground surface, and a second portion which is provided continuously in the first portion and extends in the tire width direction so as to run into the side surface or the bottom surface of the tread rubber.

6 Claims, 5 Drawing Sheets

(56) References Cited

U.S. PATENT DOCUMENTS

| | | | |
|---|---|---|---|
| 2007/0137745 A1* | 6/2007 | Lukich et al. | 152/209.5 |
| 2007/0144642 A1* | 6/2007 | Lukich et al. | 152/209.5 |
| 2009/0173419 A1* | 7/2009 | Kawakami | 152/152.1 |
| 2010/0258227 A1* | 10/2010 | Kuroki | 152/209.5 |
| 2010/0326588 A1 | 12/2010 | Cappa et al. | |

FOREIGN PATENT DOCUMENTS

| | | | |
|---|---|---|---|
| FR | 2922812 | | 5/2009 |
| JP | 10-81110 | | 3/1998 |
| JP | 11-227415 A | * | 8/1999 |
| JP | 2003-127613 | * | 5/2003 |
| JP | 2007290485 A | | 11/2007 |
| JP | 2008-001168 | * | 1/2008 |
| JP | 2009-126291 | | 6/2009 |
| JP | 2009-161070 | | 7/2009 |
| JP | 2010-115935 | | 5/2010 |
| WO | 2009/066605 | * | 5/2009 |
| WO | WO 2009/066605 | | 5/2009 |

OTHER PUBLICATIONS

Machine translation for Japan 2008-001168 (no date).*
Machine translation for 11-227415 (no date).*
European Communication for Application No. 10174535.4, Nov. 19, 2010, 5 pages.

* cited by examiner (A)

(B)

(C)

(D)

PNEUMATIC TIRE WITH TREAD HAVING CAP PORTION, SEGMENTED BASE PORTION AND CONDUCTIVE PORTION

BACKGROUND OF THE INVENTION

1. Field of the Invention

The present invention relates to a pneumatic tire which can discharge a static electricity generated in a vehicle body or a tire to a road surface.

2. Description of the Related Art

Recently, there have been proposed a pneumatic tire including a tread rubber blended with silica at a high ratio in order to reduce the rolling resistance that largely affects the fuel consumption of a vehicle and/or to increase braking performance (WET braking performance) on a wet road surface. However, compared to a tread rubber blended with carbon black at a high ratio, the electric resistance of such tread rubber is high, and accordingly, static charge generated on a vehicle body or the tire is prevented from being released to the road surface. As a result, problems like radio noises tend to occur.

There has been developed a pneumatic tire provided with a solution of the electric resistance problem in such a manner that a conductive portion blended with carbon black or the like is formed within a non-conductive tread rubber blended with silica or the like. For example, in pneumatic tires disclosed in Japanese Unexamined Patent Publication No. 10-81110, a non-conductive tread rubber is formed with a conductive portion extending in a diameter direction of the tire to release the static charge to the road surface through the conductive portion. The conductive portion extends from a ground surface to a bottom surface through the tread rubber and constitutes a conductive path for releasing the static charge.

In a pneumatic tire described in the following Japanese Unexamined Patent Publication No. 2009-126291 and WO 2009/066605, a non-conductive tread rubber is provided with a conductive portion extending in a tire width direction, for the purpose of preventing a uniformity from being deteriorated. The conductive portion extends in the tire width direction between a cap portion and a base portion from a side wall rubber or a topping rubber of a carcass which electrically conducts with a rim, and is inclined in the vicinity of a tire equator so as to be exposed to a ground surface. However, in this structure, it has been known that an ununiformity of rigidity is caused in the tread rubber, and an irregular wear tends to be generated.

In other words, in the tread rubber mentioned above, it has been known that a peripheral position of the tire equator having the conductive portions being comparatively closely formed and coming close to the ground surface wears preferentially, and a so-called center wear tends to be generated. Further, in the pneumatic tire described in Japanese Unexamined Patent Publication No. 2009-161070 filed by the present applicant, there is employed such a structure that the conductive portion is branched, in order to securely achieve a conductive performance from an early stage of the wear, and in the structure mentioned above, there is a risk that the irregular wear is remarkably generated since a degree at which the conductive portions are closely formed is increased.

SUMMARY OF THE INVENTION

The present invention is made by taking the actual condition mentioned above into consideration, and an object of the present invention is to provide a pneumatic tire which can inhibit an irregular wear from being generated while keeping a conductive performance.

The object can be achieved by the following present invention. That is, the present invention provides a pneumatic tire comprising:

a pair of bead portions;

a side wall portion extending to an outer side in a tire diametrical direction from each of the bead portions; and a tread portion connected to an outer end in the tire diametrical direction of each of the side wall portions, wherein a tread rubber arranged in the tread portion includes:

a cap portion which is formed by a nonconductive rubber and constructs a ground surface;

a base portion which is formed by a nonconductive rubber and is arranged in an inner side in the tire diametrical direction of the cap portion; and a conductive portion which is formed by a conductive rubber and runs into a side surface or a bottom surface of the tread rubber from the ground surface, wherein a rubber hardness of the cap portion is higher than a rubber hardness of the base portion, the base portion is segmented in a tire width direction, and a rubber forming the cap portion is filled in a recess at a segmented position, and wherein the conductive portion has a first portion which is provided in an outer side in the tire diametrical direction of the segmented position and extends to an inner side in the tire diametrical direction from the ground surface, and a second portion which is provided continuously in the first portion and extends in the tire width direction so as to run into the side surface or the bottom surface of the tread rubber.

In the pneumatic tire in accordance with the present invention, it is possible to discharge a static electricity generated in the vehicle body or the tire to the road surface through the conductive portion running into the side surface or the bottom surface of the tread rubber from the ground surface. Further, in the inner side in the tire diametrical direction of the first portion of the conductive portion, since the base portion is segmented in the tire width direction, and the recess of the segmented position is filled with the rubber forming the cap portion having the higher rubber hardness than the base portion, it is possible to enhance the rigidity in the position so as to suppress the wear in the early stage. Accordingly, it is possible to inhibit the irregular wear from being generated so as to secure the wear performance while keeping the conductive performance.

Further, at a time of forming the tread pattern by applying a mold to the surface of the tread rubber, there is a risk that the thickness of the cap portion becomes small in the periphery of the groove bottom, and the oppressed second portion of the conductive portion breaks down, however, in the present invention, since the rubber hardness of the cap portion is made higher than the rubber hardness of the base portion, it becomes easy to prevent the second portion from breaking down, and an advantageous structure for keeping the conductive performance can be obtained.

In the present invention, it is preferable that the first portion of the conductive portion extends toward an outer side in the tire diametrical direction from an outer peripheral surface of the base portion. In accordance with the structure mentioned above, since the first portion of the conductive portion is hard to enter the recess of the segmented position of the base portion, and it is possible to form the conductive path short without bypassing the conductive portion unnecessarily, an advantageous structure for keeping the conductive performance can be obtained.

In the present invention, it is preferable that a segmentation width of the base portion is within a range of ±10 mm of a width of the first portion. In accordance with the structure mentioned above, it is possible to effectively suppress the irregular wear by accurately arranging the rubber forming the cap portion in the region in which the wear is promoted owing to the conductive portion.

In the present invention, it is preferable that the tread rubber is provided with a main groove extending along a tire circumferential direction, the base portion is segmented in correspondence to a formed position of the main groove, and the rubber forming the cap portion is filled in a recess at a segmented position. In accordance with the structure mentioned above, since multiple rubbers forming the cap portion and being comparatively hard are arranged in the forming position of the main groove in which the pattern rigidity tends to be lowered, it is possible to suppress the irregular wear of the tread rubber so as to enhance the wear performance.

DETAILED DESCRIPTION OF THE PREFERRED EMBODIMENTS

Figure 1:
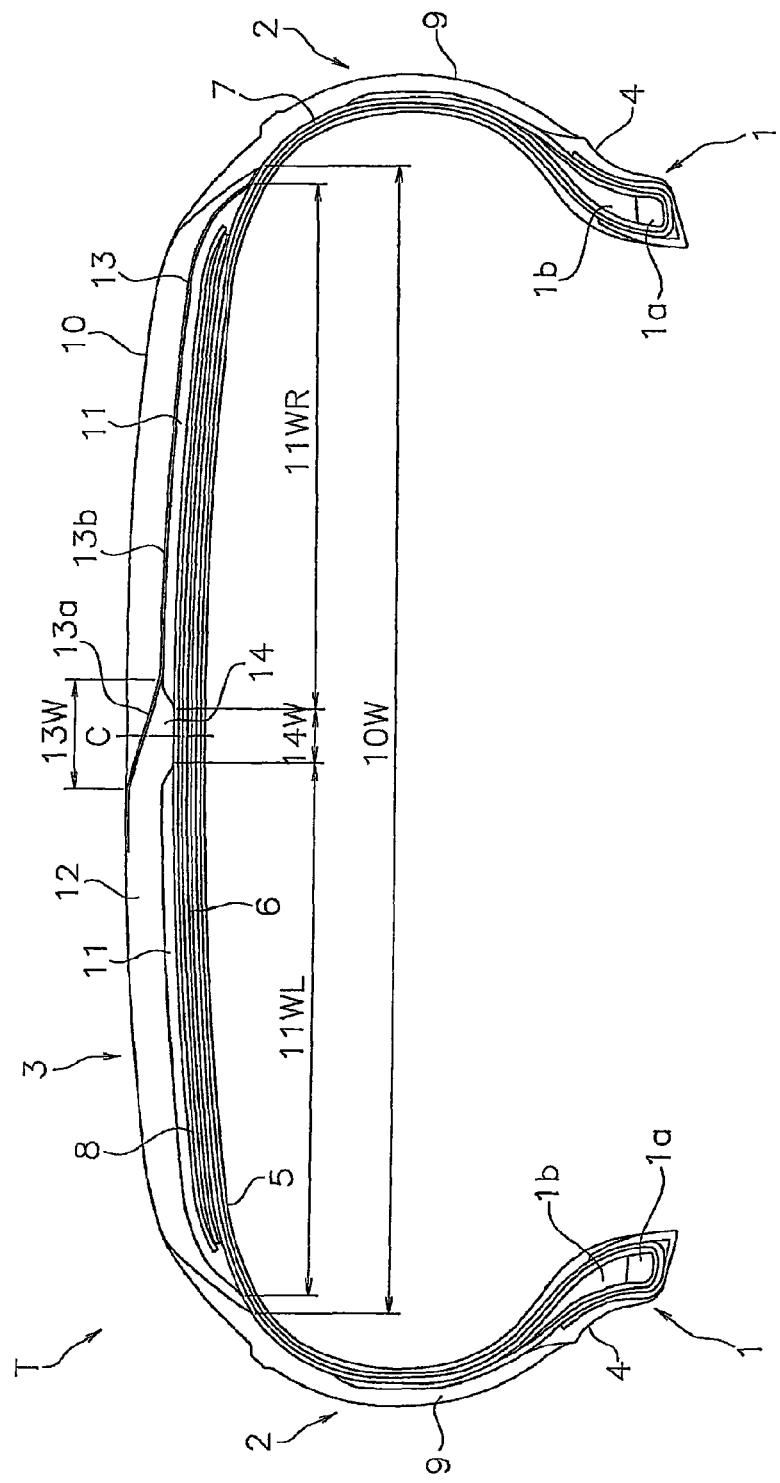
FIG. 1 is a cross sectional view of a tire meridian showing one example of a pneumatic tire according to the present invention.

An embodiment of the present invention will be explained with reference to the drawings. A pneumatic tire T shown in FIG. 1 includes a pair of bead portions 1, side wall portions 2 extending from the bead portions 1 to outer side in a tire diametrical direction, a tread portion 3 connected to outer ends in a tire diametrical direction of the side wall portions 2. The bead portion 1 includes an annular bead 1a composed of a bundle of steel wires or the like sheathed with rubber and a bead filler 1b of hard rubber disposed therein.

A toroid-shaped carcass layer 7 is arranged between the pair of bead portions 1, and an end portion thereof is fixed via the bead 1a being wound thereon. The carcass layer 7 is constructed by at least one (two in the present embodiment) carcass plies, and the carcass ply is formed by covering a cord extending at an angle of approximately 90° with respect to the tire equator C with a topping rubber. The carcass layer 7 is provided with an inner liner rubber 5 for maintaining air pressure on the inner periphery thereof.

The bead portion 1 of the carcass layer 7 is provided with a rim strip rubber 4 on the outer periphery thereof, which abuts on a rim (not shown). Also, the sidewall portion 2 of the carcass layer 7 is provided with a side wall rubber 9 on the outer periphery thereof. According to the embodiment, the topping rubber of the carcass ply, the rim strip rubber 4 and the side wall rubber 9 are formed of conductive rubber respectively.

A belt layer 6 constructed by a plurality of (two in the present embodiment) belt plies is arranged on an outer periphery of the carcass layer 7 in the tread portion 3. Each of the belt plies is formed by covering a cord extending while inclining with respect to the tire equator C with a topping rubber, and is laminated in such a manner that the cord intersects inversely to each other between the plies. A belt reinforcing layer 8 constructed by covering a cord extending substantially in a tire circumferential direction with a topping rubber is arranged in an outer periphery of the belt layer 6, however, it may be omitted as occasion demands.

A tread rubber 10 arranged in the tread portion 3 comprises of a cap portion 12 formed by a nonconductive rubber and constructing a ground surface, a base portion 11 formed by a nonconductive rubber and arranged in an inner side in a tire diametrical direction of the cap portion 12, and a conductive portion 13 formed by a conductive rubber and running into a bottom surface of the tread rubber 10 from the ground surface. In the present embodiment, there is employed a so-called side on tread structure in which the end portions of the side wall rubber 9 are mounted to both end portions of the tread rubber 10.

In this case, the conductive rubber points to a rubber in which a specific volume resistance is less than $10^8$ Ω·cm, and is produced, for example, by blending a carbon black serving as a reinforcing agent in a raw material rubber at a high ratio. The conductive rubber can be obtained by blending a predetermined amount of known conductivity applying material such as a carbon including a carbon fiber, a graphite and the like, or a metal including a metal powder, a metal oxide, a metal flake, a metal fiber and the like in addition to the carbon black. Further, the nonconductive rubber points to a rubber in which a specific volume resistance is equal to or more than $10^8$ Ω·cm, and is produced, for example, by blending a silica serving as the reinforcing agent in the raw material rubber at a high ratio.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

It is preferable that the conductive rubber forming the conductive portion 13 has a composition which satisfies such a relationship that a nitrogen adsorption specific surface area $N_2SA$ (m$^2$/g)×compounding amount (mass %) of the carbon black is equal to or more than 1900, preferably equal to or more than 2000, and a dibutyl phthalate oil absorption DBP (ml/100 g)×compounding amount (mass %) of the carbon black is equal to or more than 1500, preferably equal to or more than 1700, in the light of enhancing the durability of the conductive portion 13 so as to improve the conductive performance. $N_2SA$ is determined in conformity with ASTM D3037-89, and DBP is determined in conformity with ASTM D2414-90.

In this tire T, since both the base portion 11 and the cap portion 12 are formed by the nonconductive rubber, it is possible to well enhance an improving effect caused by using the nonconductive tread rubber (an improving effect of a specific fuel consumption performance and a WET braking performance in the case that the tread rubber 10 is blended with the high silica). The conductive portion 13 is inclined in the vicinity of the tire equator C so as to be exposed to the ground surface, and extends in the tire width direction between the cap portion 12 and the base portion 11 so as to come into contact with the carcass layer 4. A static electricity generated in the vehicle body or the tire is discharged to the road surface through the conductive path via the rim, the rim strip rubber 4, the side wall rubber 9, the topping rubber of the carcass ply and the conductive portion 13.

A rubber hardness Hc of the cap portion 12 is higher than a rubber hardness Hb of the base portion 11, and the rubber hardness Hc is exemplified by 67±5° and the rubber hardness Hb is exemplified by 57±5°. It is preferable that a hardness difference Hc−Hb is within a range between 1 and 20°, and it is more preferable that it is within a range between 3 and 15°. If the hardness difference is less than 1°, there is a tendency that an improving effect of a wear performance becomes smaller, and if this hardness difference goes beyond 20°, the cap portion 12 is too hard or the base portion 11 is too soft, and there is a risk that the other tire performance is deteriorated. A numerical value of the rubber hardness is a value obtained by measuring in conformity with a durometer hardness test (type A) of JISK6253.

Figure 2:
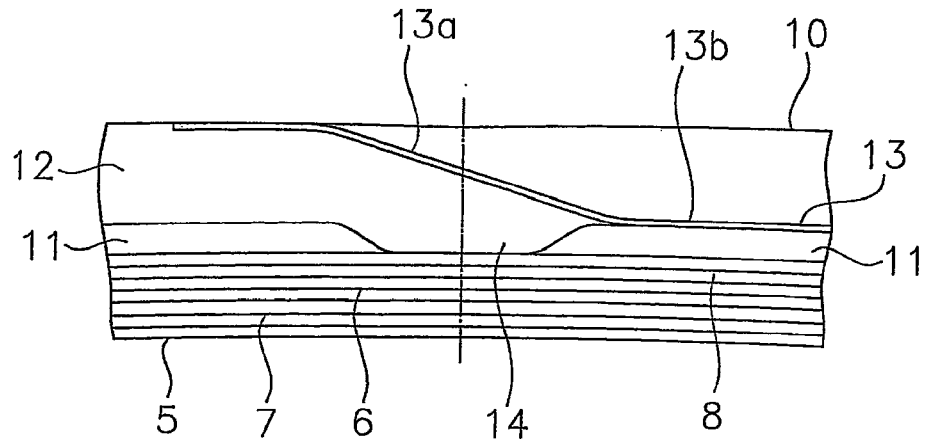
FIG. 2 is an enlarged view showing a substantial part of the tire in FIG. 1.

In this tread rubber 10, as shown in FIG. 2 in an enlarged manner, the base portion 11 is segmented in a tire width direction, and a recess 14 in the segmented position is filled with a rubber forming the cap portion 12. The conductive portion 13 has a first portion 13a which is provided in an outer side in a tire diametrical direction of the segmented position and extends to an inner side in the tire diametrical direction from a ground surface, and a second portion 13b which is provided continuously in the first portion 13a and extends in the tire width direction so as to run into a bottom surface of the tread rubber 10.

In accordance with the structure mentioned above, the rubber forming the cap portion 12 and having a high rubber hardness is more arranged in a peripheral position of the tire equator C having the first portion 13a being comparatively closely formed and coming close to the ground surface, and it is possible to enhance the rigidity at the position so as to suppress a wear in an early stage. In other words, the tread rubber 10 is structured such as to cancel a rigidity reduction caused by the first portion 13a by locally increasing a volume of the cap portion 12, whereby it is possible to uniformize the rigidity of the tread rubber 10 and inhibit an irregular wear from being generated. Further, since a cornering power is increased by increasing the volume of the cap portion 12, it is possible to contribute to an improvement of a steering stability on a dry road surface.

Figure 3:
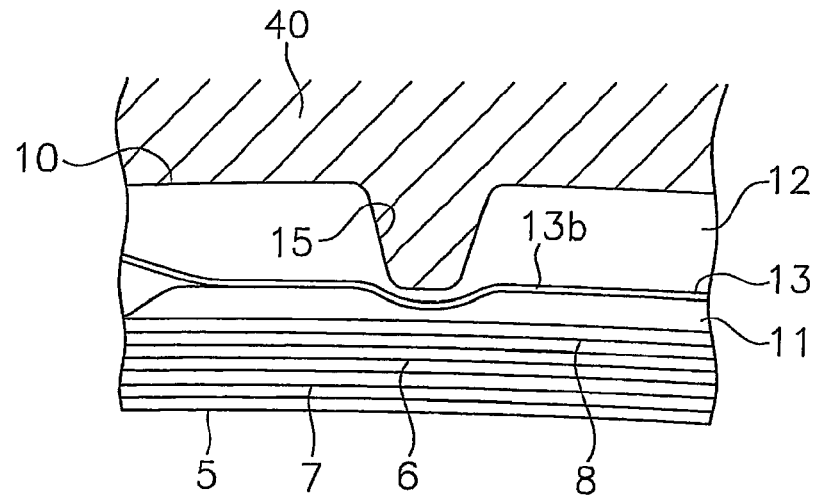
FIG. 3 is an enlarged view of a substantial part and shows a state of forming a tread pattern.

Further, as shown in FIG. 3, at a time of pressing a mold 40 to a surface of the tread rubber 10 so as to form the tread pattern, a thickness of the cap portion 12 becomes small in the periphery of the groove bottom, however, it becomes easy to prevent the second portion 13b from being disconnected due to a hardness of the cap portion 12 and it is possible to well keep the conductive performance, in the tread rubber 10.

It is preferable in the light of securing a uniformity of the tire that the base portion 11 is segmented in a center region including the tire equator C such as the present embodiment, and the first portion 13a of the conductive portion 13 is provided in the center region. In order to enhance the uniformity, it is preferable that the base portion 11 is segmented uniformly into right and left sections, specifically that a right and left width ratio 11WL/11WR from the end portion of the segmented base portion 11 to the recess 14 comes to 1.0±0.2.

It is preferable that a segmentation width 14W of the base portion 11 is between 2 and 10% of the width 10W of the tread rubber 10. If it is less than 2%, there is a tendency that an effect of suppressing the irregular wear becomes small, and if it goes beyond 10%, there is a tendency that the first portion 13a becomes excessively wide, and a rolling resistance becomes large. Further, it is preferable for accurately suppressing the irregular wear that the segmentation width 14W is within a range of ±10 mm of the width 13W of the first portion 13a. This width 13W is measured in a section from an outer peripheral surface of the base portion 11 to the ground surface, and comes to a section in which the first portion 13a is inclined in the present embodiment.

Figure 4:
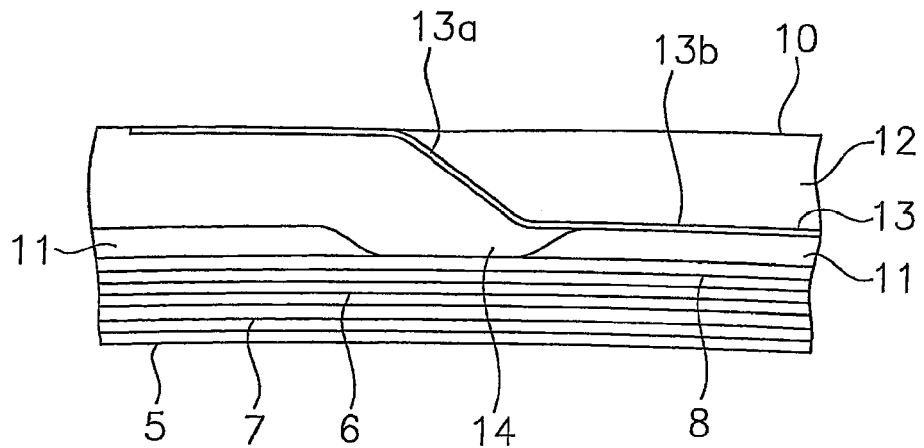
FIG. 4 is an enlarged view of a substantial part and shows a conductive path in accordance with the other embodiment of the present invention.

In the present embodiment, since the first portion 13a extends from the outer peripheral surface of the base portion 11 toward an outer side in the tire diametrical direction, the first portion 13a is hard to enter the recess 14, and it is possible to form a conduction path short without making the conductive portion 13 bypass unnecessarily. On the contrary, as shown in FIG. 4, if the first portion 13a extends to the outer side in the tire diametrical direction from the above of the recess 14, there is a case that the first portion 13a enters the recess 14 particularly at a time of forming the tread pattern, and the conductive portion 13 goes a long way unnecessary and the conductive path becomes complicated.

In the present embodiment, the first portion 13a is wider than the recess 14, that is, the width 13W is larger than the segmentation width 14W, and the conductive portion 13 is exposed to the ground surface in the outer side in the tire diametrical direction of the base portion 11 in place of the recess 14. The conductive portion 13 extends its leading end portion in the tire width direction while suitably having the width 13W of the first portion 13a, and secures an exposure frequency on the ground surface so as to enhance a freedom of a pattern design. All the same time, the first portion 13a is inclined linearly in the outer side in the tire diametrical direction at the segmented position of the base portion 11 so as to extend, in order to prevent the conductive path from being redundant.

The ground surface to which the conductive portion 13 is exposed indicates the surface of the tread portion grounding on the road surface at a time when the tire is put vertically on the flat road surface in a state of being assembled in a normal rim and being filled with a normal internal pressure, and a normal load is applied. The normal rim is a rim which is determined per tire by a standard system including a standard on which the tire is based, for example, is a standard rim in JATMA, "Design Rim" in TRA, or "Measuring Rim" in ETRTO.

The normal internal pressure is a pneumatic pressure determined per tire by a standard system including a standard on which the tire is based, and is a maximum pneumatic pressure in JATMA, a maximum value described in Table "TIRE LOAD LIMITS AT VARIOUS COLD INFLATION PRESSURES" in TRA, or "INFLATION PRESSURE" in ETRTO, however, in the case that the tire is for a passenger car, it is set to 180 kPa. Further, the normal load is a load determined per tire by a standard system including a standard on which the tire is based, and is a maximum load capacity in JATMA, a maximum value described in Table mentioned above in TRA, or "LOAD CAPACITY" in ETRTO, however, in the case that the tire is for a passenger car, it is set to 85% of a corresponding load to 180 kPa.

The conductive portion 13 is provided in such a manner as to be connected to the rim or the rubber which can be conductive from the rim, and constructs a conductive path for discharging a static electricity to the road surface. In this tire T, it is possible to form any or all of the topping rubber of the carcass ply, the rim strip rubber 4 and the side wall rubber 9 by a nonconductive rubber, and in this case, the conductive portion 13 may be extended to the side wall rubber 9, the rim strip rubber 4 or an outer wall surface of the rim strip rubber 4 coming into contact with the rim. Further, it is possible to form the topping rubber of the belt layer 6 or the belt reinforcing layer 8 by the nonconductive rubber.

Figure 5:
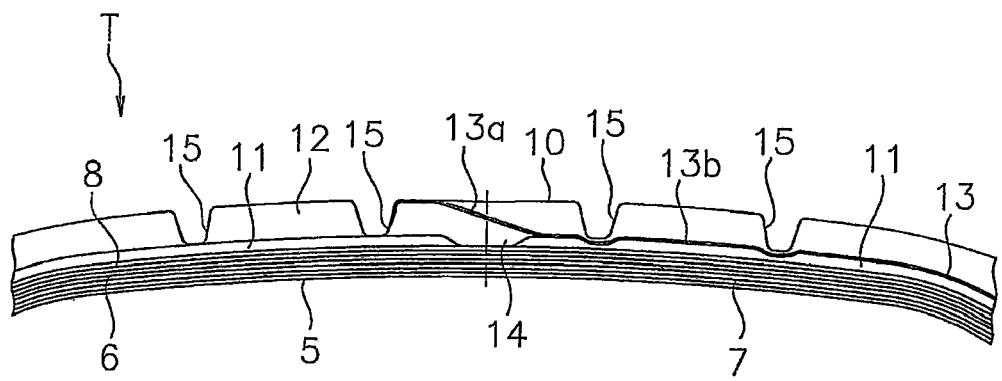
FIG. 5 is a sectional view showing a tread portion after forming the tread pattern.

The mold 40 is pressed against the surface of the tread rubber 10 as shown in FIG. 3, and various tread patterns are formed in correspondence to the demanded tire performance or used condition. As shown in FIG. 5, the tread rubber 10 with the tread pattern is provided with main grooves 15 extending along a tire circumferential direction. It is preferable that the formed position of the main groove 15 is deviated from the section of the segmentation width 14W while avoiding the outer side in the tire diametrical direction of the segmented position of the base portion 11 in such a manner as to prevent the first portion 13a from bypassing unnecessary, and it is more preferable that it is positioned in the outer side in the tire width direction rather than the section of the width 13W.

Figure 6:
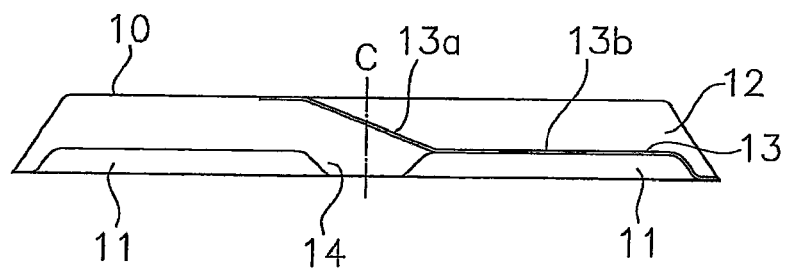
FIG. 6 is a cross sectional view schematically showing a simple substance of a tread rubber.

A description will be given briefly of one example of a method of manufacturing the pneumatic tire T, with reference to FIGS. 6 and 7. FIG. 6 is a cross sectional view showing the tread rubber 10 by a simple substance. Although an illustration is omitted, the belt layer 6 and the belt reinforcing layer 8 are actually arranged in the inner periphery of the tread rubber 10. The pneumatic tire T shown in FIG. 1 can be manufactured by combining the tread rubber 10 with the other tire constructing members such as the carcass layer 7, the side wall rubber 9 and the like. Since this tire T can be manufactured in the same manner as the conventional tire manufacturing step except the point relating to the tread rubber 10, a description will be given by focusing on a forming step of the tread rubber.

First of all, as shown in FIG. 7(A), the base portion 11 segmented in the tire width direction is formed by attaching the nonconductive rubber to a forming surface 41 constructed by an outer peripheral surface of a forming drum or the like. The formation of the base portion 11 can be carried out in accordance with an extrusion forming method or a ribbon winding method. The extrusion forming method is a construction method of extrusion molding a band-like rubber member having a predetermined cross sectional shape and jointing end portions thereof to each other so as to form an annular shape. The ribbon winding method is a construction method of winding a rubber ribbon having a small width spirally in a tire circumferential direction so as to form a desired cross sectional shape.

Next, as shown in FIG. 7(B), a half 12L of the cap portion 12 is formed by the nonconductive rubber. At this time, the rubber forming the cap portion 12 is filled in the recess 14, and an inclined surface 16 for mounting the conductive portion 13 in a post process is formed in the outer side in the tire diametrical direction of the segmented position of the base portion 11. The inclined surface 16 extends from one outer peripheral surface of the segmented base portion 11 to the other outer side in the tire diametrical direction. The formation of the cap portion 12 can be carried out in accordance with the extrusion forming method or the ribbon winding method.

Figure 7:
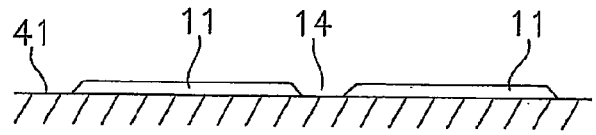
FIGS. 7(A) to 7(D) are cross sectional views schematically showing a forming step of the tread rubber.
Figure 7:
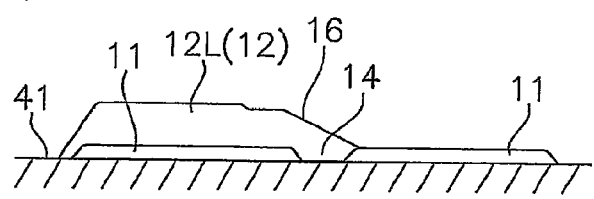
Figure 7:
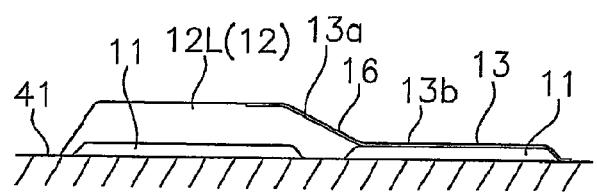
Figure 7:
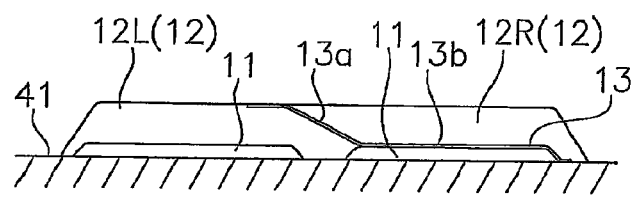

Subsequently, as shown in FIG. 7 (c), the conductive portion 13 is formed by the conductive rubber. The conductive portion 13 extends in such a manner as to run into the bottom surface of the tread rubber 10 from the ground surface through the above of the inclined surface 16 and the base portion 11, the first portion 13a is mounted on the inclined surface 16 and the second portion 13b successive thereto is mounted on the base portion 11. The formation of the conductive portion 13 is carried out in accordance with the arrangement of the sheet-like rubber member, or the ribbon winding method, and they can be used together.

The tread rubber 10 shown in FIG. 6 can be obtained by forming a remaining half 12R of the cap portion 12 by the nonconductive rubber, as shown in FIG. 7 (D), after forming the conductive portion 13. In this example, the second portion 13b reaches the bottom surface of the tread rubber 10, however, the structure may be made such that the end portion of the cap portion 12 is aligned with the end portion of the base portion 11, and the second portion 13b is exposed to the side surface of the tread rubber 10, and is thereafter brought into contact with the side wall portion 9 or the like.

Figure 8:
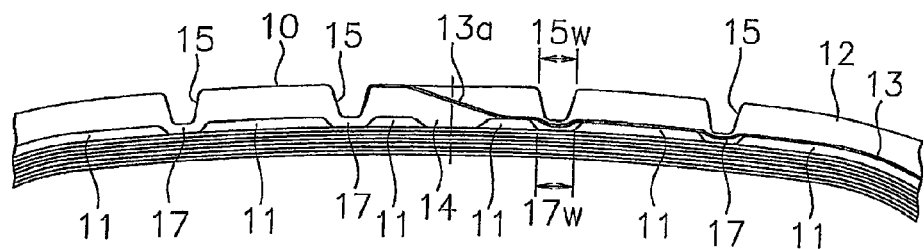
FIG. 8 is a cross sectional view showing a tread portion in accordance with the other embodiment of the present invention.

As shown in FIG. 8, in the tread rubber 10 in accordance with the other embodiment of the present invention, the base portion 11 is segmented in correspondence to the formed position of the main groove 15, and the recess 17 at the segmented position is filled with the rubber forming the cap portion 12. At the formed position of the main groove 15, there is a tendency that the pattern rigidity is lowered and the wear is put forward, however, it is possible to prompt a uniformizing of the wear of the tread rubber 10 so as to inhibit the irregular wear from being generated, by arranging more the hard rubber forming the cap portion 12 as mentioned above. At a time of forming the tread rubber 10, the rubber forming the cap portion 12 may be filled in the recess 17 after forming the base portion 11 and before forming the conductive portion 13.

Further, since the rubber forming the cap portion 12 is more arranged in the periphery of the groove bottom of the main groove 15, in an example in FIG. 8, it is possible to effectively prevent the disconnection of the second portion 13b against the oppression by the mold 40, and it is possible to obtain a structure which is advantageous for keeping the conductive performance. Further, since it is possible to secure the thickness of the cap portion 12 at the groove bottom of the main groove 15, it is effective for suppressing a crack (an ozone crack) generated in the groove bottom due to an aged deterioration. In order to securely achieve the operation and effect mentioned above, it is preferable that a segmentation width 17W of the base portion 11 under the main groove 15 is equal to or more than a groove width 15W of the main groove 15.

[Other Embodiments]

Figure 9:
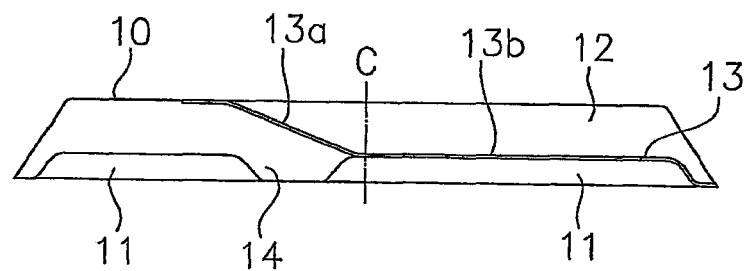
FIG. 9 is a cross sectional view showing a tread rubber in accordance with the other embodiment of the present invention.

(1) In the embodiment mentioned above, there is shown the example in which the base portion 11 is segmented in the center region including the tire equator C, and the first portion 13a of the conductive portion 13 is provided in the center region, however, the present invention may be structured, as shown in FIG. 9, such that the base portion 11 is segmented at a position which is offset from the center region, and the first portion 13a is provided in an outer side in the tire diametrical direction of the segmented position.

Figure 10:
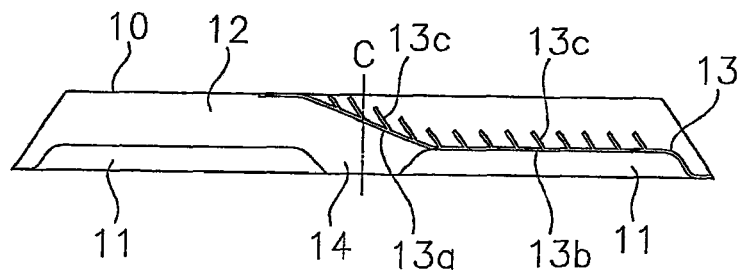
FIG. 10 is a cross sectional view showing a tread rubber in accordance with the other embodiment of the present invention.

(2) The present invention may be structured, as shown in FIG. 10, such that the conductive portion 13 has a branch portion 13c extending to the outer side in the tire diametrical direction. In this case, since there is a risk that the irregular wear is remarkably generated due to the conductive portions 13 which are closely formed, the structure in accordance with the present invention is particularly useful. It is preferable that at least one of the branch portions 13c extending from the first portion 13a is exposed to the ground surface, whereby the conductive portion 13 tends to be exposed to the ground surface from an early stage of the wear, and it is possible to effectively secure the conductive performance. The branch portion 13c extending from the second portion 13b is terminated in the inner portion of the cap portion 12, however, is exposed to the ground surface in accordance with the wear of the tread rubber 10, and secures a contact frequency between the conductive portion 13 and the road surface so as to easily maintain the conductive performance to an end stage of the wear.

EXAMPLE

An example tire which concretely shows the structure and effect of the present invention will be explained. A size of the tire presented for evaluation is 245/55R19, a rubber hardness Hc of the cap portion constructing the tread rubber is 67°, and a rubber hardness Hb of the base portion is 57°. However, in a comparative example 3, the rubber hardness Hc and Hb are set to 62°.

(1) Conductive Performance

An electric resistance value was measured by applying a predetermined load to the tire installed to the rim, and applying an applied voltage (500V) to a metal plate with which the tire grounds from the shaft supporting the rim.

(2) Wear Performance

An amount of wear of the main groove was measured in the center side and the outer side in the tire width direction after traveling at a distance 12000 km, and a ratio thereof (outer side/center side) is evaluated. The wear is uniformized in accordance that the numerical value comes close to 1.0, and it indicates to be excellent in the wear performance.

(3) Uniformity

Based on a test method defined in JISD4233, LFV (lateral force variation) was measured, and uniformity of a tire was evaluated. Specifically, the tire set to the pneumatic pressure 200 kPa was pressed against a rotating drum in such a manner that a load 640 N is applied, and an amount of fluctuation of a force in a tire lateral direction generated at a time of rotating the tire while keeping a distance between both the shafts constant was measured. A comparative example 1 is set to 100 and a result is evaluated with indices, the more the numeric value is the more excellent the uniformity is.

(4) Cornering Power (CP)

A cornering power was measured by using a flat belt type cornering tester. A comparative example 1 is set to 100 and a result is evaluated with indices, the more the numeric value is the more excellent the cornering power is.

(5) Steering Stability (Dry)

The tire was installed to an actual car so as to be traveled on a dry road surface, and was evaluated in accordance with a subjective evaluation by a driver. A comparative example 1 is set to 100 and a result is evaluated with indices, the more the numeric value is the more excellent the steering stability is.

(6) Rolling Resistance (RR)

A rolling resistance was measured by a rolling resistance tester, and was evaluated based on an inverse number thereof. A comparative example 1 is set to 100 and a result is evaluated with indices, the more the numeric value is the more excellent the rolling resistance is.

In the tread rubber which does not segment the base, the tread rubber which is not provided with the conductive portion was set to a comparative example 1, and the tread rubber which is provided with the conductive portion as shown in FIG. 6 was set to a comparative example 2. Further, the tread rubber having the same structure as the example 1 except the rubber hardness was set to a comparative example 3. Further, in the tread rubber which segments the base portion, the tread rubber which is provided with the conductive portion such as FIG. 6 was set to examples 1 and 2, and the tread rubber which is provided with the conductive portion such as FIG. 4 was set to an example 3, the tread rubber in which the conductive portion is offset such as FIG. 9 was set to example 4, and the tread rubber in which the base portion is segmented below the main grooves such as FIG. 8 was set to an example 5. The segmentation width 14W was set to 15 mm in the comparative example 3, and the examples 1, 2, 4 and 5, and was set to 30 mm in the example 3. The width 13W was set to 25 mm in the comparative example 2 and 3, and the examples 1, 3, 4 and 5, and was set to 45 mm in the example 2. Results of the evaluation are shown in Table 1.

TABLE 1

|  | rubber harness (°) | | conductive performance (MΩ) | wear performance | UF | CP | Dry | RR |
| --- | --- | --- | --- | --- | --- | --- | --- | --- |
|  | Hc | Hb | | | | | | |
| comparative example 1 | 67 | 57 | ∞ | 1.0 | 100 | 100 | 100 | 100 |
| comparative example 2 | 67 | 57 | 3 | 0.5 | 100 | 95 | 95 | 99 |
| comparative example 3 | 62 | 62 | 3 | 0.7 | 99 | 96 | 96 | 99 |
| example 1 | 67 | 57 | 3 | 1.0 | 99 | 100 | 100 | 99 |
| example 2 | 67 | 57 | 3 | 0.9 | 99 | 98 | 98 | 99 |
| example 3 | 67 | 57 | 3 | 1.2 | 99 | 102 | 102 | 98 |
| example 4 | 67 | 57 | 3 | 1.1 | 98 | 100 | 100 | 99 |
| example 5 | 67 | 57 | 3 | 1.0 | 97 | 104 | 104 | 97 |

As shown in Table 1, in the comparative example 1 which is not provided with the conductive portion, the conductive performance is not applied. Further, in the comparative example 2 in which the base portion is not segmented, and the comparative example 3 in which the cap portion has the same rubber hardness as the base portion, the conductive performance is applied, however, the wear performance is deteriorated by generating the center wear. On the contrary, in the examples 1 to 5, it is possible to inhibit the irregular wear from being generated while keeping the conductive performance.

What is claimed is:
1. A pneumatic tire comprising:
a pair of bead portions;

a side wall portion extending to an outer side in a tire diametrical direction from each of the bead portions; and a tread portion connected to an outer end in the tire diametrical direction of each of the side wall portions, wherein a tread rubber arranged in the tread portion includes:

a cap portion which is formed by a nonconductive rubber and constructs a ground surface;

a base portion which is formed by a nonconductive rubber and is arranged in an inner side in the tire diametrical direction of the cap portion; and a conductive portion which is formed by a conductive rubber and runs into a side surface or a bottom surface of the tread rubber from the ground surface, wherein a rubber hardness of the cap portion is higher than a rubber hardness of the base portion, the base portion is segmented in a tire width direction, the width of the base portion segmentation being between 2% and 10% of the width of the tread rubber in the tire width direction, and a rubber forming the cap portion is filled in a recess at a segmented position of the base portion, and wherein the conductive portion has a first portion which is provided in an outer side in the tire diametrical direction of the segmented position and extends to an inner side in the tire diametrical direction from the ground surface, and a second portion which is provided in such a manner as to continue to the first portion and extends in the tire width direction so as to run into the side surface or the bottom surface of the tread rubber, the width of the first portion in the tire width direction being greater than the width of the base portion segmentation, and the conductive portion has a plurality of branch portions extending to an outer side in a tire diametrical direction, wherein at least branch portions extending from the second portion terminate within the cap portion rubber.

2. The pneumatic tire according to claim 1, wherein the first portion of the conductive portion extends toward an outer side in the tire diametrical direction from an outer peripheral surface of the base portion.

3. The pneumatic tire according to claim 1, wherein a segmentation width of the base portion is within a range of ± 10 mm of a width of the first portion.

4. The pneumatic tire according to claim 1, wherein the tread rubber is provided with a main groove extending along a tire circumferential direction, the base portion is segmented in correspondence to a formed position of the main groove, and the rubber forming the cap portion is filled in a recess at a segmented position.

5. The pneumatic tire according to claim 1, wherein at least one of the branch portions extending from the first portion extends through the cap portion and is exposed to the ground surface.

6. The pneumatic tire according to claim 1, wherein the tread portion has main grooves formed in a tire circumferential direction which are not aligned in a tire diametrical direction with a base portion segmented position.

* * * * *